Nov. 23, 1948.  G. W. BROWN ET AL  2,454,549
ELECTRONIC EQUATION SOLVER
Filed Aug. 16, 1946  7 Sheets-Sheet 1
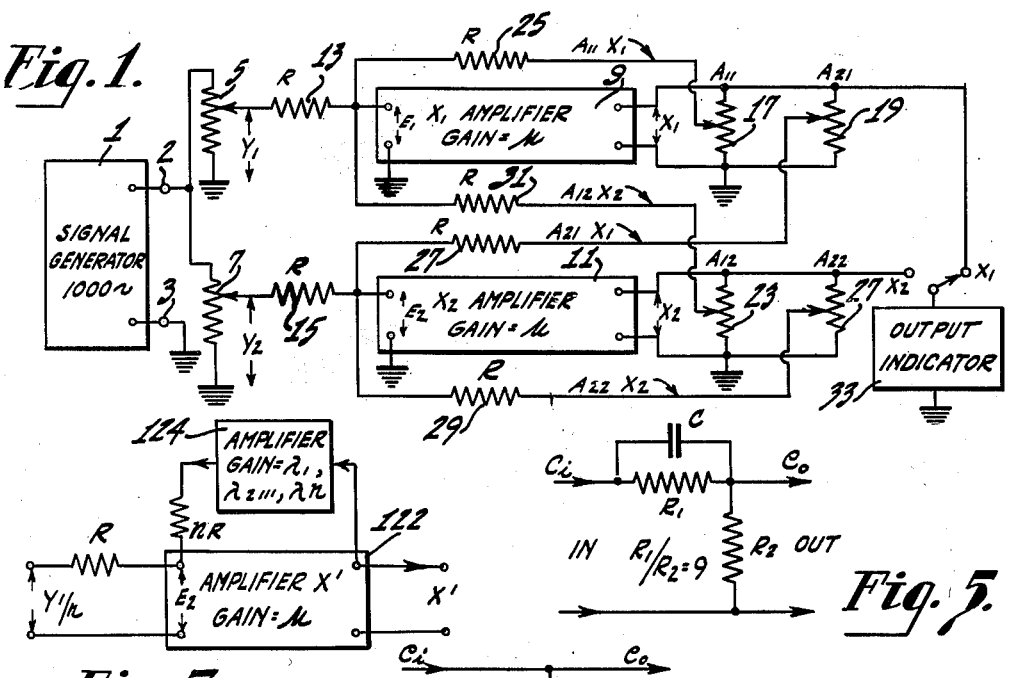
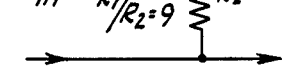
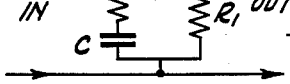
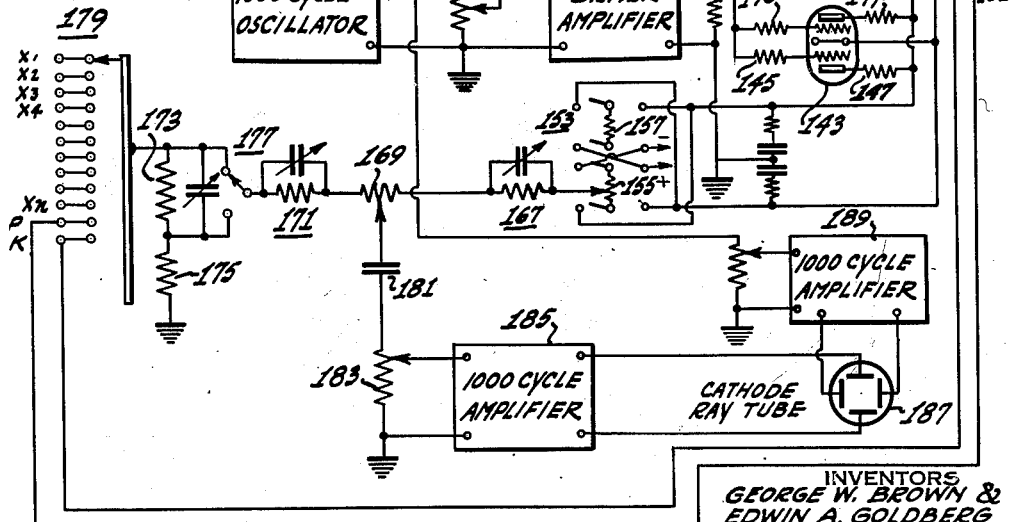
INVENTORS
GEORGE W. BROWN &
EDWIN A. GOLDBERG
BY  C D Luska
ATTORNEY

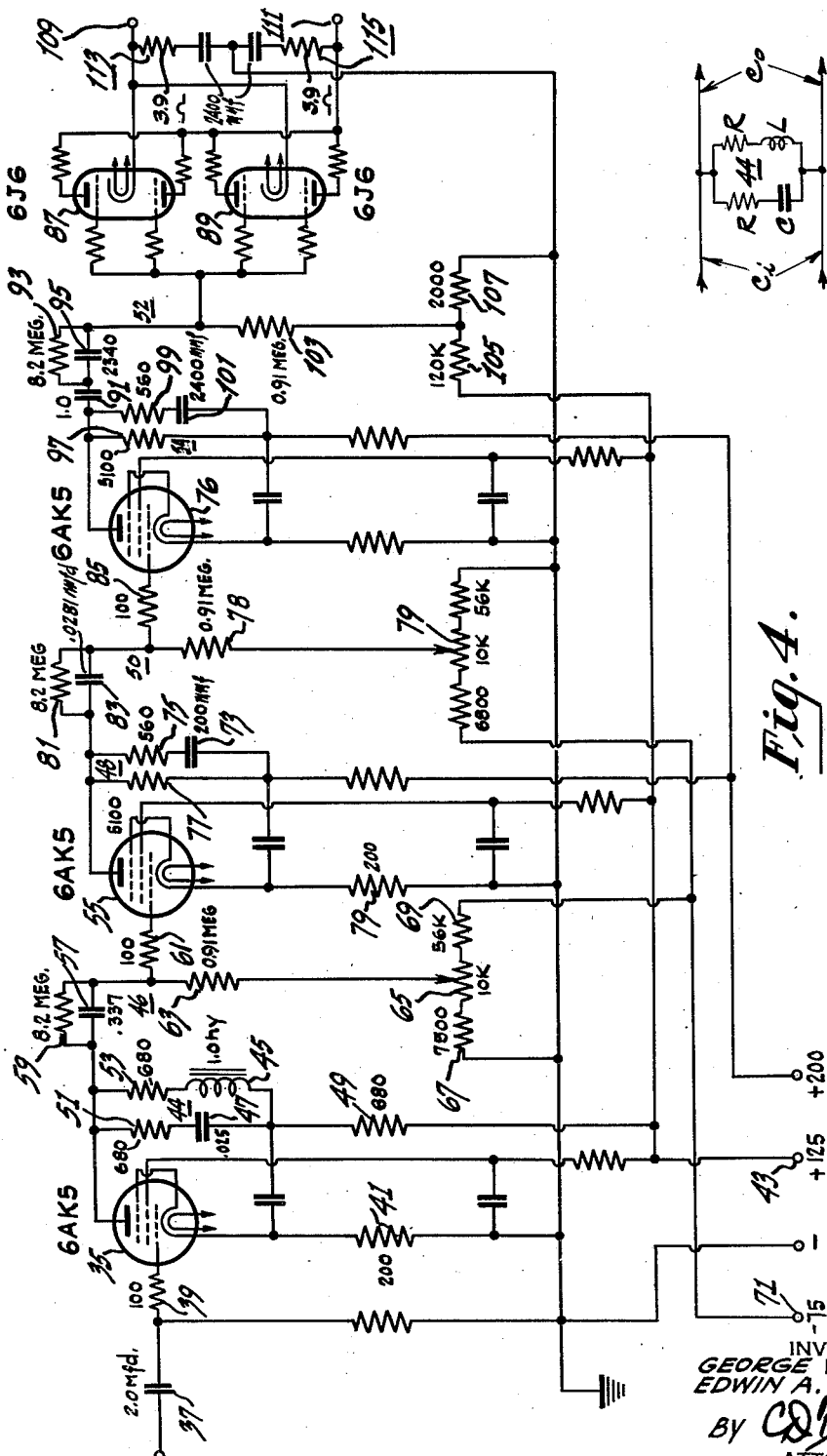

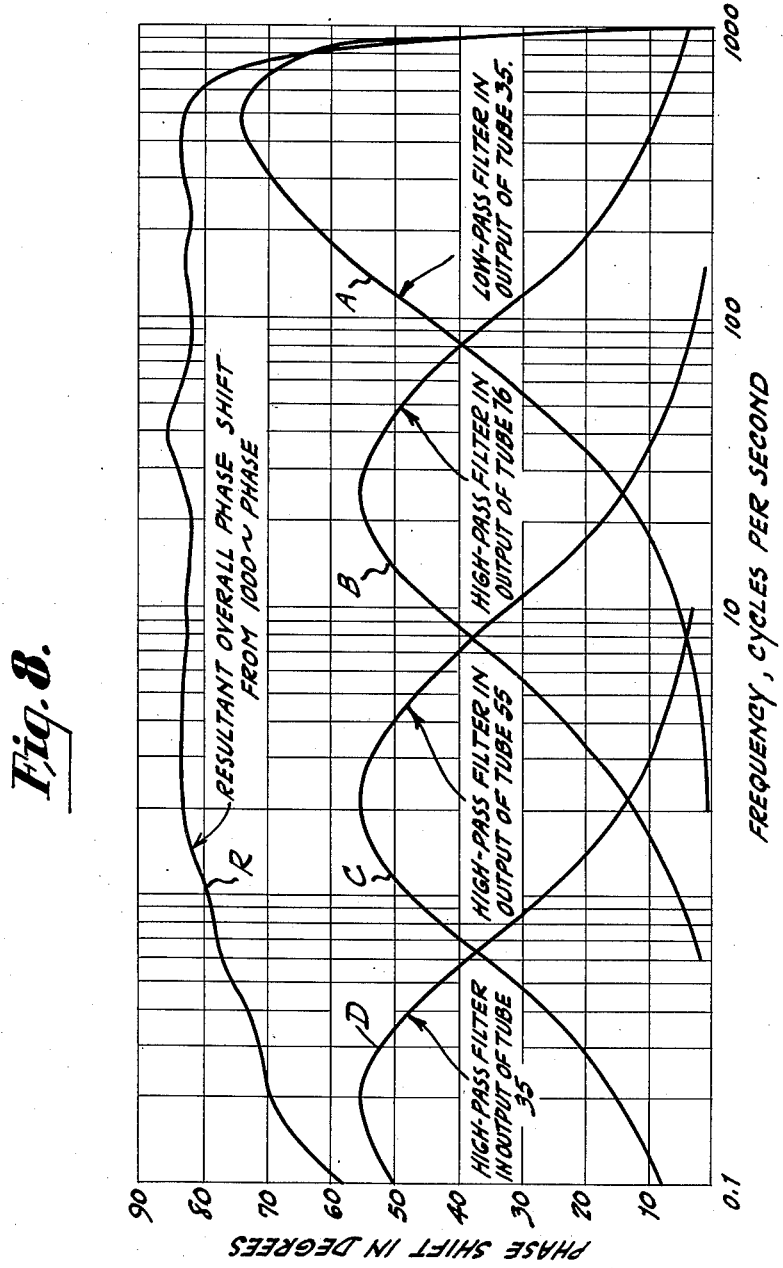

Patented Nov. 23, 1948

2,454,549

UNITED STATES PATENT OFFICE 2,454,549

ELECTRONIC EQUATION SOLVER

George W. Brown, Cranbury, and Edwin A. Goldberg, Princeton, N. J., assignors to Radio Corporation of America, a corporation of Delaware Application August 16, 1946, Serial No. 690,865

3 Claims. (Cl. 235—61)

This invention relates to a method of and means for electronically solving linear simultaneous equations. As is well known, simultaneous equations are two or more equations which are satisfied by the same sets of values of the unknown quantities. The solution of such equations by conventional methods becomes more and more involved as the number of equations and unknowns increases. Conventional methods are unsatisfactory for the solution of systems of simultaneous equations involving, say, five to ten equations and unknowns because the process is too tedious, particularly when a solution is attempted by trial and error methods. It is therefore the primary object of this invention to provide a new method of and means for electronically solving simultaneous equations.

The electronic solution of simultaneous equations in accordance with this invention utilizes the amplitude and phase of a plurality of voltages to represent the value and sign of the known terms of the various equations, and the method is therefore a continuous one as distinguished from the step or counter methods of calculation which have sometimes been used for electronic computation. It will be shown that by establishing a first series of voltages representative of the values of the constant terms of a plurality of simultaneous equations, establishing a second series of voltages representative of the coefficients of the unknown terms in each equation, and properly combining with each of the first series of voltages the ones of the second series which represent terms in a given equation, the resultant voltages are indicative of the unknown terms.

In carrying out this invention a number of amplifiers, equal to the number of equations to be solved, are interconnected by mutual feedback circuits in such a manner that when input voltages are adjusted to correspond in amplitude and phase to the value and sign of the constant terms of the equations and are applied to the respective amplifiers, and feedback voltages are selected which are proportional to predetermined fractions of the output of each amplifier, and are fed back into the input of each amplifier, respectively, and where the predetermined fractional values are determined by the coefficients of the corresponding unknowns, then the amplitudes and phases of the output voltages of the amplifiers determine the values and signs of the unknowns. It is therefore a further object of this invention to provide an electronic equation solver capable of solving a plurality of simultaneous equations.

More particularly, the system which illustrates a preferred embodiment of this invention and which may be utilized in practicing the method herein described, employs a number of voltage dividers of the potentiometer type, each having an accurately calibrated dial scale adjustable to three pertinent places, for determining the input voltages in terms of a selectable percent of a reference voltage and also for deriving from each amplifier output the desired fractional feedback voltages. A system for solving up to ten equations including ten unknown values or roots, would have, for each equation, one dial for setting the constant term potentiometer plus ten dials for setting the potentiometers which provide the ten coefficients of the ten unknowns, or a total of eleven dials and potentiometers per equation. For the ten equations there would be a total of 110 dials and potentiometers, preferably arranged in ten horizontal rows of eleven dials each. Of course the solution of say, five equations, would only involve the use of the six dials of any five rows. It is therefore a further object of this invention to provide a simultaneous equation solver in which the known values may be applied to the device by setting at the appropriate values a number of calibrated dials so that the device is direct reading.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which Figure 1 is a schematic diagram illustrating the principle of operation of this invention;

Figure 3 is an equivalent diagram of a feedback amplifier useful in explaining the theory of operation of the interconnected feedback amplifier networks;

Figure 4 is the circuit diagram of a stable amplifier suitable for use in the equation solver;

Figure 5 is the circuit diagram of a high pass filter utilized in the equation solver;

Figure 6 is the circuit diagram of a low pass filter utilized in the equation solver;

Figure 7 is the circuit diagram of a band pass filter utilized in the equation solver;

Figures 8 and 9 are graphs illustrating the phase shift characteristics of the amplifier shown in Fig. 4;

Figure 10 is a schematic diagram of the signal generator, bridge and indicator components of the equation solver.

Fig. 1 illustrates in simplified form (for $n=2$) the theory of operation of a device for solving a system of $n$ simultaneous equations of the type $$Y_1 = A_{11}X_1 + A_{12}X_2 \ldots A_{1n}X_n \quad (1)$$
$$Y_2 = A_{21}X_1 + A_{22}X_2 \ldots A_{2n}X_n \quad (2)$$

Figure 2:
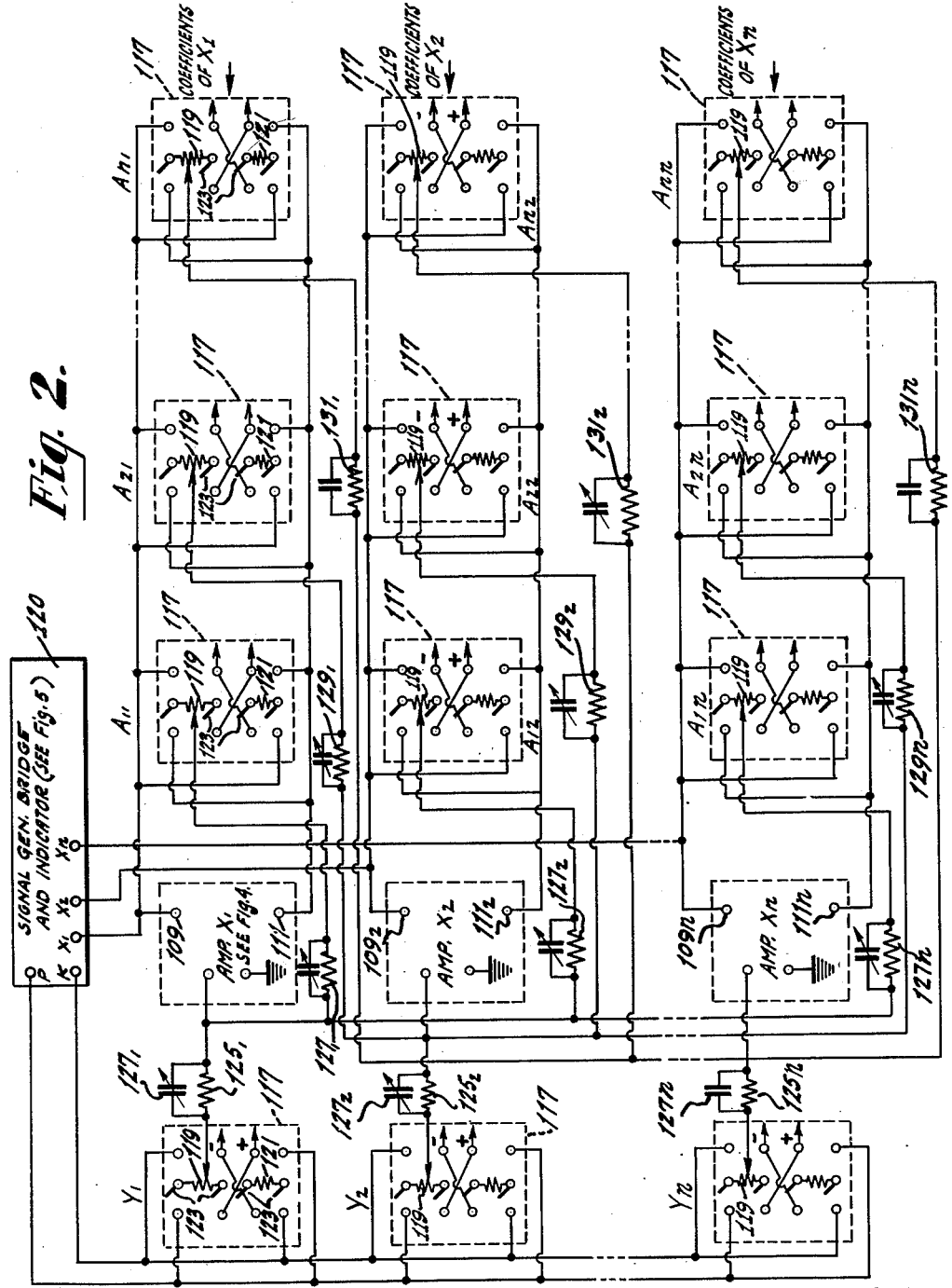
Figure 2 is a schematic diagram illustrating the method of connecting the components of a preferred embodiment of an equation solver for the solution of $n$ simultaneous equations.

and $$Y_n = A_{n1}X_1 + A_{n2}X_2 \ldots A_{nn}X_n \quad (3)$$

where $X_1, X_2 \ldots X_n$ are the unknowns;
$A_{11}, A_{21} \ldots A_{n1}$ the constant coefficients of $X_1$;
$A_{12}, A_{22} \ldots A_{n2}$ the constant coefficients of $X_2$, etc.; and
$Y_1, Y_2 \ldots Y_n$ are constants.

The basic system involves the application of alternating input voltages to a number of amplifiers, the number being the same as the number of simultaneous equations to be solved, which are so interconnected by resistance networks that the output voltages are proportional to the values of the corresponding unknowns.

Thus, in Fig. 1, a signal generator 1 produces an alternating reference voltage having a frequency of the order of 1000 c. p. s. Its output is connected to terminals 2, 3 across which two potentiometers 5 and 7 are connected. The movable arms are connected, respectively, to the $X_1$ and $X_2$ amplifiers 9 and 11 through summing resistors 13 and 15. One input terminal of each amplifier is grounded.

The characteristics and details of the amplifier will be described hereinafter. For the present assume the gain of each amplifier has the value $\mu$. The output of each amplifier is applied to two potentiometers, 17 and 19 being connected to amplifier $X_1$ while 21 and 22 are connected to amplifier $X_2$. The output of potentiometer 17 is applied to the input of its associated amplifier 9 through a summing resistor 25 while the output of potentiometer 19 is applied to the input of the other amplifier 11 through a summing resistor 27. Similarly, the output of potentiometer 21 is applied to amplifier 11 and that of potentiometer 23 to the input of amplifier 9 through summing resistors 29 and 31, respectively. The value R of each of the summing resistors should be high with respect to the total potentiometer resistance of 1000 ohms, and may be, for example, of the order of 500,000 ohms.

Considering the steady state operating conditions, let the various terms be as follows:

$X_1$ = output voltage of amplifier $X_1$
$X_2$ = output voltage of amplifier $X_2$
$A_{11}$ = fraction of $X_1$ derived from potentiometer 17
$A_{21}$ = fraction of $X_1$ derived from potentiometer 19
$A_{22}$ = fraction of $X_2$ derived from potentiometer 21
$A_{12}$ = fraction of $X_2$ derived from potentiometer 23
$Y_1$ = voltage input derived from potentiometer 5
$Y_2$ = voltage input derived from potentiometer 7
$E_1$ = voltage across input to amplifier $X_1$
$E_2$ = voltage across input to amplifier $X_2$ then it follows $$X_1 = \mu E_1 \quad (4)$$
$$X_2 = \mu E_2 \quad (5)$$
$$E_1 = 1/3(A_{11}X_1 + A_{12}X_2 + Y_1) \quad (6)$$
$$E_2 = 1/3(A_{21}X_1 + A_{22}X_2 + Y_1) \quad (7)$$

Transposing and substituting the value of E from (4) and (5)

$$-Y_1 = (A_{11} - 3/\mu)X_1 + A_{12}X_2 \quad (8)$$

and $$-Y_2 = A_{21}X_1 + (A_{22} - 3/\mu)X_2 \quad (9)$$

If $\mu$ at the operating frequency is known the term $-3/\mu$ may be subtracted from the terms $A_{11}$ and $A_{22}$. Equations 8 and 9 are then seen to be the same as 1 and 2 except that the sign of Y is reversed. Full equivalence can easily be established by properly phasing Y with respect to X. This may be done within the amplifier or by any conventional means as is well known. The gain of most amplifiers is subject to wide variations due to tube life, changes in line voltage and the like. While the gain could be measured as often as necessary, rather than measuring and subtracting $3/\mu$ from each term, it is preferred to make the gain $\mu$ at the operating frequency so large that the term $-3/\mu$ can be neglected, and then Equations 8 and 9 will be identical with 1 and 2, the same phase adjustment being assumed. The actual value of gain depends upon the accuracy desired. A value for $\mu$ of 15,000 for a ten equation solver has been found to be satisfactory and to produce an error within the limitations of other circuit parameters. Thus, since the operating equation of the circuit of Fig. 1 is identical to a simultaneous pair of equations in two unknowns, it follows that if the system is stable, and when the known values are applied as indicated above, the measured value of voltages $X_1$ and $X_2$ will satisfy the unknown values of the simultaneous equations. That is, if the input potentiometers 5 and 7 are adjusted so that the voltages $Y_1$ and $Y_2$ measured to ground are equal to the values of the constants $Y_1$ and $Y_2$ of any two simultaneous equations, of the type illustrated by Equations 1 and 2, and the output potentiometers are set at fractional values of the output voltages equal to the coefficients of $X_1$ and $X_2$, then the output voltages $X_1$ and $X_2$ will be equal to the values of the unknowns which satisfy the equations. The signal generator voltage may be maintained at some convenient standard value so that the input potentiometer dials will be direct reading, or by bridging the X voltage against the generator voltage, the output indicated will be independent of the input amplitude, as will be more fully explained below. The output potentiometers may also be calibrated in terms of percent of the amplifier output voltage derived at any setting of the movable contact arms, and will also be direct reading. Single phase operation has been illustrated in the simplified showing of Fig. 1. It is to be understood, however, that push-pull driving circuits may be employed and either potentiometers with grounded center taps or suitable switches utilized to establish the proper phase or sign for the voltages representing the equation. To accomplish this phase reversal most efficiently, the potentiometers may be connected alternatively in the anode and cathode circuits of the associated vacuum tubes. As is well known, this will reverse the phase of the current, and thus reverse the phase of the output voltage.

The accuracy of the system depends to a large degree upon the accuracy with which the potentiometers can be set to the desired resistance ratio, and therefore a potentiometer of the type known as a "Micropot" is preferred. This type of potentiometer consists of a 10 turn helical resistance element with an effective length of about 3¾ feet. Preferably the potentiometers are equipped with counter type dials indicating the contactor position by a decimal system calibration which thus permits the equations to be set up directly with reasonable accuracy.

The circuit illustrated in Fig. 1 is suitable for solving two simultaneous equations involving two unknowns where the voltages are measured with a suitable voltmeter. The system may be extended to include the solution of $n$ simultaneous equations involving $n$ unknowns by providing $n$ "Y" networks, and $n$ amplifiers, each amplifier feeding into $n$ parallel connected "A" networks. The scheme for connecting "$n$" systems is illustrated in Fig. 2, to which reference is now made.

As suggested briefly above, phase reversal is accomplished in the preferred embodiment of this invention, by connecting the potentiometers 119 in the plate circuits of the associated driver tubes for the phases which can be called "—" and in the cathode circuits of the same tubes for the "+" phase. In order to insure constant positive and negative phase balance as the Micropots are switched from one circuit to the other, fixed resistors 121 of equal value are simultaneously switched so as to replace the Micropots. Thus the plate and cathode impedances are constant at all times so long as the load connected to the Micropot is negligible. In Fig. 2, the combination of a Micropot 119, or equivalent potentiometer, the balancing resistor 121 and the polarity reversing switch 123 shown enclosed in a dotted line, is hereinafter referred to as a "network." Each such network has been given a common reference numeral 117. The individual networks are preferably identified by their functional representation which indicates their place in the general form of the Equation 1, 2 or 3. Thus the subscript of the Y networks indicates which of the $n$ equations the network in question is to be associated with. In setting up the value of the constant $Y_1$ in Equation 1, network $Y_1$ would be used, and so forth. Two subscripts identify each A network. The first of these identifies the equation while the second identifies the unknown which it modifies.

In order to obtain the voltage representative of the constant Y, each network $Y_1, Y_2, \ldots Y_n$ is connected to the plate "P" and cathode "K" terminals of the signal generator, bridge and indicator device 120 which is shown in detail in Fig. 10. The "—" and "+" connections indicated in each network 117 are to be connected to the — (ground) and + terminals of a source of D. C. potential of 150 volts to provide plate voltage to the driver tubes as will appear necessary from a consideration of Fig. 10.

The output of network $Y_1$ is connected through an impedance such as a summing resistor $125_1$ shunted by a phasing capacitor $127_1$ to the input of amplifier $X_1$. Similarly the output of network $Y_2$ is connected through a summing resistor $125_2$ shunting by a phasing capacitor $127_2$ to the input of amplifier $X_2$ and the output of network $Y_n$ is connected to the input of amplifier $X_n$ through resistor $125_n$ and capacitor $127_n$. To obtain phase selection in the A networks, output terminals 109 and 111 of the X amplifiers connect internally to the cathode and plate electrodes of the amplifier output tubes, as will appear from a consideration of Fig. 4. These output terminals are connected to the polarity reversing switches of networks $A_{11}, A_{21}, \ldots A_{n1}$ so that when any switch 123 is to the left the Micropot is in the circuit from plate to B+ and the balancing resistor 121 is in the circuit from cathode to B— or ground, as shown, similarly, the output of amplifier $X_2$ connects to the polarity reversing switches of networks $A_{12}, A_{22}, \ldots A_{n2}$ and the output of amplifier $X_n$ is connected to networks $A_{1n}, A_{2n}, \ldots A_{nn}$.

The movable contact of each Micropot of the A networks is connected through a summing resistor, which may be shunted with a phasing capacitor, to the input of the amplifier identified by the first numeral of the A network subscript. Thus, the output of each network of the series $A_{11}, A_{12}, \ldots A_{1n}$ is connected to amplifier $X_1$ through resistors $127_1, \ldots 127_n$, respectively, and the associated capacitors. Similarly, the output of each network of the series $A_{21}, A_{22}, \ldots A_{2n}$ is connected to the input of amplifier $X_2$ through resistors $129_1, 129_2, \ldots 129_n$, respectively, and the output of each network of the series $A_{n1}, A_{n2}, \ldots A_{nn}$ is connected to the input of amplifier $X_n$ through resistors $131_1, 131_2, 131_n$, respectively, so that the feedback voltages of each amplifier are applied to the input terminals of all the amplifiers, respectively.

For convenience, the output voltages of amplifiers $X_1, X_2, \ldots X_n$ are measured successively. To accomplish this each amplifier output is connected to a correspondingly numbered terminal $X_1, X_2, \ldots X_n$ of the device 120 which includes the indicator shown in detail in Fig. 10.

It is to be noted that the first equation (1) of $n$ simultaneous equations would be set up in the equation solver by adjusting network $Y_1$ in accordance with the constant term, and the A networks in the first column $A_{11}, A_{12}, \ldots A_{1n}$ in accordance with the corresponding coefficients of $X_1, X_2, \ldots X_n$. Similarly, Equation 2 would be applied to the $Y_2$ network and the A networks of the second column, and so on. It is also to be noted that the A networks in any horizontal row are the coefficients of a given unknown. This arrangement of rows and columns may be retained in the physical layout of the network potentiometers, or the A rows and columns may be physically interchanged.

The construction of a practical device of the type illustrated in Figs. 1 and 2 requires the solution of certain problems regarding system stability, and accuracy. The dynamic stability and the accuracy of solution are intimately related to the characteristic roots of the matrix of coefficients of the equations. For definition and properties of these terms, reference is made to the textbook of Bôcher "Introduction to Higher Algebra," or any other textbook of higher algebra. Briefly, associated with a square matrix of $n$ rows and $n$ columns, with real elements, there are associated $n$ characteristic roots $\lambda_i$ which are real or occur in conjugate complex pairs. With respect to stability and accuracy it can be shown that the behavior of the system of Fig. 2 is essentially identical to the behavior of a hypothetical system consisting of $n$ independent circuits of the type shown in Fig. 3 where the input voltage $Y^1/n$ is applied through a summing resistor having a value R to an amplifier 122 of gain $\mu$, the output of which is fed back to the input through a hypothetical amplifier 124, whose complex gain $\lambda_1, \lambda_2, \ldots \lambda_n$ as the case may be, is constant at all frequencies, and a summing resistor $nR$. Thus the analysis of the large number of interconnected networks of Fig. 2 may be reduced to the determination of the performance of a conventional equivalent where the performance characteristics are well known. The interconnected network will then be stable when all $n$ of the independent equivalent networks, corresponding to the $n$ possible characteristic roots, are stable, and not otherwise.

In order that there may exist at least one series of equations which may be solved with an acceptable degree of accuracy, it is at least necessary that the X amplifier be capable of stable operation with sufficient feedback to insure the degree of accuracy required. The operation of the feedback amplifier of Fig. 3 may be expressed.

$$-Y_1' = \left(\lambda_1 - \frac{n+1}{\mu}\right)X_1'$$
$$\vdots \quad \vdots \quad \vdots$$
$$-Y_n' = \left(\lambda_n - \frac{n+1}{\mu}\right)X_n'$$

It may be seen that the degree of accuracy is determined by the ratio of $\lambda$ to the value of $$\frac{n+1}{\mu}$$

at the operating frequency. Also a fairly large $\lambda$ makes more efficient use of the potentiometer dial scale factor. Thus if the equation solver is to be used primarily in the solution of equations whose characteristic roots are real and positive (assuming the amplified output to be 180° out of phase with the input voltage without feedback) it is sufficient that the amplifier be capable of sustaining the feedback with relatively little phase margin. An amplifier with phase margin of ±90° will permit stable solution of any set of equations whose characteristic roots, while complex, have positive real parts.

Referring to Fig. 4, there is illustrated an amplifier having the required characteristics which may be used in the complete equation solver illustrated by Fig. 2. The input voltage is applied to the grid of a high gain amplifier tube 35 of the 6AK5 type, through a 2μfd coupling capacitor 37 and a grid parasitic suppression resistor 39. Cathode self-bias is provided by resistor 41 in the cathode return. Conventional screen bias for all the screen grid tubes is obtained from a source of positive voltage applied to terminal 43. The plate load includes a resonant circuit or band pass filter 44 tuned to 1000 cycles and comprising a 1.0 henry choke 45 and a 0.025μfd capacitor 47, the high potential ends of the capacitor and choke being connected to plate through damping resistors 51 and 53, respectively. The common low potential end of the filter is by-passed to cathode and connected to terminal 43 through an isolating resistor 49. The plate of the first amplifier tube 35 is connected to the grid of the second amplifier tube 55 through a high pass filter 46 comprising parallel-connected capacitor 57, resistor 59, and the resistor 63. The midpoint of the two resistors is connected to the grid of tube 55 through a parasitic reducing resistor 61. Since there is a D. C. path between the second amplifier grid and the first amplifier plate, the grid must be held at a stable, relatively low D. C. potential. This is accomplished by connecting the ground end of resistor 63 to a source of negative D. C. potential derived from a resistor network including a potentiometer 65 and two fixed resistors 67 and 69 so connected across a negative potential source available at terminal 71 that the effective grid voltage may be made approximately zero.

The second amplifier is connected similarly, except that a low pass coupling network 48 is used, including series connected capacitor 73 and resistor 75, both in shunt with another resistor 77. Effectively zero grid bias for the third amplifier tube 76 is provided through resistor 78 by potentiometer 79 connected to the same source of negative potential available at terminal 71. The plate of the second amplifier 55 is coupled to the third amplifier grid through a second high pass filter 50 comprising resistor 78 and the shunt connected resistor 81 and capacitor 83. A small parasitic suppression resistor 85 may also be used.

In order to provide output voltage at a sufficient level and impedance to feed a large number of parallel potentiometers, two dual triode amplifiers 87 and 89 of the 6J6 type are employed. All the grids are connected in parallel, and coupled to the plate of the third amplifier 76 through a large coupling capacitor 91 and a high pass filter network 52 including shunt-connected resistor 93 and capacitor 95, both in series with a grid resistor 103. The plate load of amplifier 76 includes a low pass network 54 comprising resistor 97 in parallel with series connected resistor 99 and capacitor 101. Grid bias for the output tubes is provided through grid resistor 103, the lower end of which is connected to a voltage divider comprising resistors 105 and 107 connected between ground and terminal 43. The cathode electrodes of the output tubes are all connected together and to an output terminal 109. The plate electrodes are all connected together through parasitic suppression resistors to terminal 111. Low pass filter networks 113 and 115 are connected between the output terminals and ground. The plate and cathode circuits to B+ and ground, respectively, are completed through the Micropots in the A networks 117, as indicated above.

To provide the desired degree of accuracy the overall amplifier gain at 1000 cycles has been made approximately 15,000. High gain amplifiers, however, may become unstable particularly where there is a direct feedback path from output to input. Self oscillation or other instability will prevent solution of the equation. The conditions for stability have been stated above, namely that the 1000 cycle phase shift shall be 0° and 180° and that the added phase shift or phase margin for other frequencies shall not exceed ±90° except for frequencies so far removed from the operating frequency that the net amplifier gain at those frequencies is less than unity. Such a design insures stability for any degree of feedback required to represent a system of simultaneous equations whose matrix has no characteristic roots with a phase angle greater than ±90°. Within this range are all passive linear electrical network problems, that is, networks which do not include voltage generators or negative resistance. However, any system of simultaneous linear equations may be solved, provided the solution is finite, if a transformation is made to convert the system into one which meets the above limitation before applying the equation to the electrical equation solver. This conversion is well known by those skilled in the art and need not be explained further here.

In Fig. 4, the actual values of the components necessary to meet the above requirement have been shown. However, it is not intended that the specific circuit and specific values illustrated shall be a limitation, since those skilled in the art will recognize modifications which may be made to accomplish the same result.

With regard to the amplification of the normal 1000 cycle signal, the operation of the amplifier is straightforward. The only care that must be exercised is to insure that the reactive elements are chosen so as to produce a negligible phase shift in the coupling circuits so that the overall phase shift will be 0° or 180°. This is accomplished, for example, by utilizing resonant circuits or by selecting series-connected capacitors of negligible impedance at 1000 cycles, and parallel-connected capacitors of sufficiently high impedance at 1000 cycles that minimum phase shift is introduced. This design requirement presents no unusual problems and is well known to those skilled in the art.

Although no frequencies other than 1000 cycles are intentionally introduced into the circuit, the design for stability against transient voltages and parasitic oscillations due to the feedback connection must consider the possible existence of currents of complex frequencies for which the overall amplifier gain exceed unity. The following remarks are presented to explain how the circuit constants were chosen and to demonstrate that the phase margin requirements have been met over the range of frequencies which it is necessary to consider.

Considering first the resonant circuit 44 in the plate return of tube 35, illustrated separately in Fig. 7, inductive and capacitive reactances L and C were selected which resonated at 1000 cycles. It is known that at resonance the phase shift is zero, and that on either side of resonance the phase shift approaches 90° and is positive in one direction and negative in the other. The effect of resistors R (51 and 53 in Fig. 4) is to limit the maximum phase shift to a value substantially less than 90°. The actual frequency vs. phase shift curve of the circuit employed rises rapidly to a maximum of 74° at 2000 cycles and 500 cycles and then gradually reduces to a few degrees at 100 kc. and 10 cycles, respectively. The low frequency portion of this curve is shown as curve A of Fig. 8. The high frequency portion of the curve is shown at A' in Fig. 9.

The high pass filters are each of the type illustrated in Fig. 5 in which $$R_1/R_2 = 9$$

It will be noted that for very low frequencies C can be neglected and the coupling circuit is then simply a voltage divider with a step down ratio of 10:1. At high frequencies, however, C effectively short-circuits $R_1$, and the full output is applied to the succeeding grid. The added phase shift is negligible at relatively low and relatively high frequencies, the actual frequencies where this occurs being determined by the size of C, and is a maximum at the intermediate frequency at which the capacitive reactance $X_c$ equals $2.85R_2$. However, as is well known, where the ultimate attenuation is 10:1, i. e., where $$R_1/R_2 = 9$$

the maximum phase shift does not exceed 55°. In order to keep the net added phase shift from exceeding 90° it is therefore necessary to stagger the points of maximum phase shift of the different high pass filters with respect to frequency of occurrence, as shown in Fig. 8.

Since the phase shift for frequencies below 1000 cycles due to the resonant plate load was known to reach a relatively low value, say less than 40°, at a frequency of 85 cycles, (see curve A, Fig. 8) the curve B of the nearest high pass network should be so located that the phase shift for frequencies above, say 75 cycles, does not exceed about the same value. The resultant (curve R, Fig. 8) will then be less than 90° with some margin of safety. The point on the relative frequency vs. phase shift curve of a high pass filter of the type illustrated in Fig. 5 at which the phase shift equals 40° is the point at which the capacitive reactance equals the value of $R_2$. Considering first the filter 52 in the output of tube 76, $R_2$ (resistor 103) is seen to be .91 megohm. The capacitor whose reactance at 75 cycles is equal to .91 megohm is one of approximately 2340 µµf. This is therefore the value selected for capacitor 95.

The high pass filter 50 in the output of tube 55 was then determined in the same manner. A capacitor of .0281 µf. has .91 megohm reactance at 6.25 cycles. A value of .0281 µfd. was therefore selected for capacitor 83. The phase shift is as shown by curve C of Fig. 8. The value of capacitor 57 was then determined in the same manner, and the phase shift is as shown by curve D, Fig. 8. It is not necessary to consider any lower frequencies, since the amplifier gain has reached a value less than unity at a frequency of 0.19 cycle, as shown by Fig. 11, and consequently oscillation cannot take place for any value of feedback.

Figure 11:
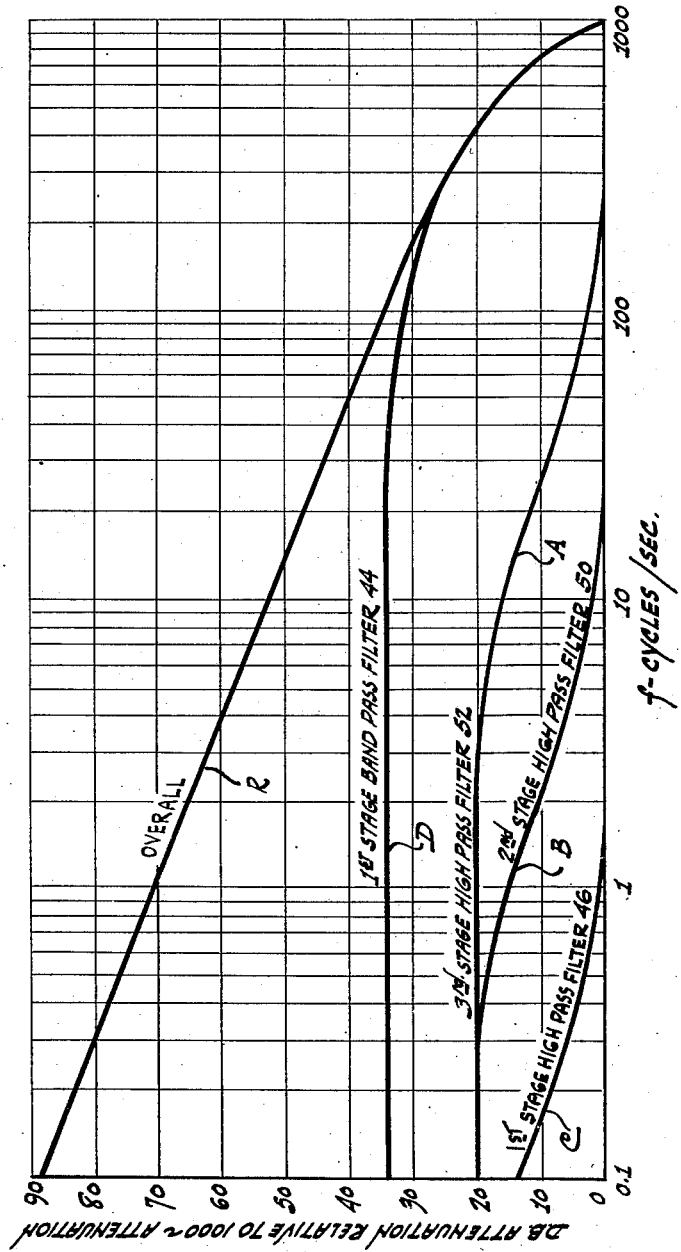
Figures 11 and 12 are graphs illustrating the attenuation characteristics of the filters included in the amplifier of Fig. 4.

Referring to Fig. 11, the attenuation of each of the high pass filters has been plotted separately and the resultant attenuation shown. Curve A is the attenuation of high pass filter 52, B the attenuation of filter 50, C that of filter 46 and D that of the band pass filter 44, all shown for the range below 1000 cycles and plotted in db. Curve R is the resultant attenuation considering all filters. Since an attenuation of 83.5 db. corresponds to an attenuation of 15,000:1, and since the amplifier gain is 15,000, it follows that at 0.19 cycle, and below, the resultant gain of the amplifier is less than unity. This is the lower frequency of the amplifier employed which need be considered in determining the resultant phase margin. Fig. 8 shows that the phase shift does not exceed 90° throughout this range, and the required operating characteristic for frequencies below 1000 cycles has therefore been met.

Figure 9:
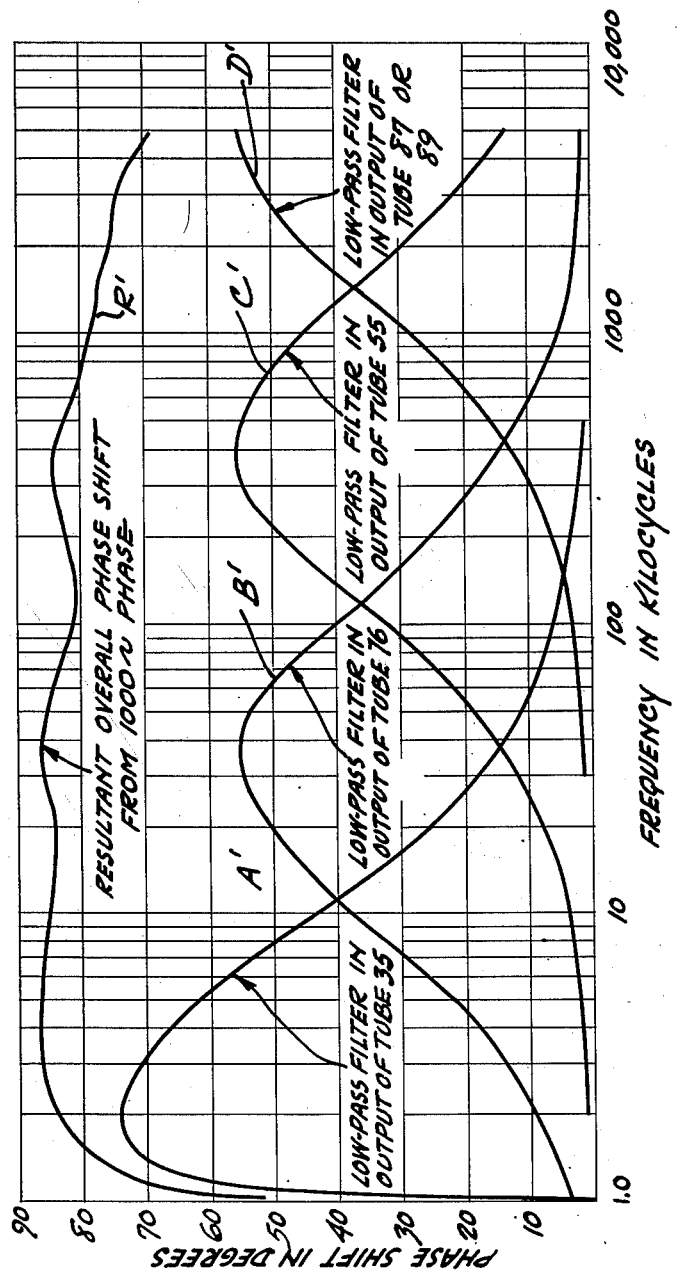

The low pass filters are designed similarly. Fig. 6 represents the circuit utilized.

$$R_1/R_2$$

is made equal to 9, as before, so that the maximum phase shift does not exceed 55°. The point at which the phase shaft reaches approximately 40° occurs when $X_c = R_1$. This point is then used to calculate the values of the capacitors. Fig. 9, curve A' shows the phase shift above 1000 cycles due to the resonant circuit 44 in the output of tube 35. 11 kc. was taken as the point at which the low pass filter 54 associated with tube 76 would cross the first curve, as shown by curve B'. $R_1$ (resistor 97) is 5100 ω. The capacity whose reactance at 13 kc. is 5100 (necessary to make the two curves cross at 11 kc.) is approximately 2400 µµf., the value selected for capacitor 101. It can be seen, therefore, that capacitor 101 in the output circuit of tube 55 will be 200 µµf., and the phase shift as represented by curve C' of Fig. 9.

Figure 12:
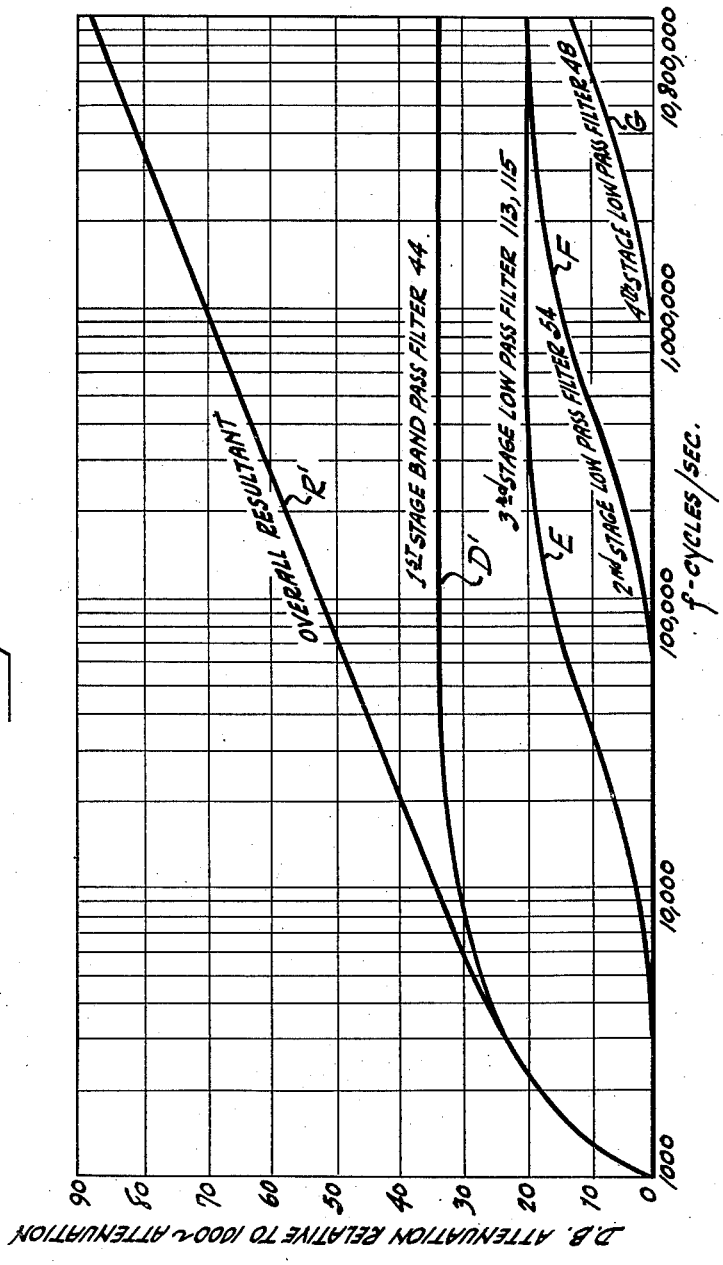

In determining the value for the capacitor in filters 113 and 115, the value of $R_1$ is determined by the parallel impedance of $n$ "A" networks. In the case when $n=10$, and the total resistance of each Micropot is 1000 $\omega$, the effective value of $R_1$, considering the shunt drive impedance of the driver tubes, (cathode circuit) is 33 $\omega$. The capacitor whose reactance at 1.7 mc. is 33 $\omega$ is 2800 $\mu\mu f$. A standard value of 2400 $\mu\mu f$ was selected. The phase shift is as illustrated by curve D', Fig. 9. The resultant added phase shift is shown by curve R', Fig. 9, and it is seen that it does not exceed 90°. Values above 5400 kc. need not be considered since the amplifier gain is then less than unity, as will appear from Fig. 12 to which reference is now made.

The individual attenuation curves of the low pass filters and the band pass filter are plotted against frequency in the range above 1000 cycles. Curve D' is the band pass filter 44, E represents the attenuation of the filters 113 or 115, F the filter 54, and G the filter 48. The resultant R' represents the effective attenuation above 1000 cycles. It will be seen that an attenuation of 15,000:1 (83.5 db.) is reached at 5.4 megacycles. This frequency is therefore the upper limit of the range over which the phase shift need be considered. Fig. 9 shows that the overall phase shift is less than 90° throughout this range, and the design requirement has therefore been met for the high frequency range also.

Referring now to Fig. 10, the components of the signal generator, bridge and indicator 120 are shown in schematic form. The 1000 cycle voltage which is used to actuate the Y networks of Fig. 2 is obtained from a conventional 1000 cycle oscillator 135, the output of which is applied through a gain control potentiometer 137 to the input of a conventional driver amplifier 139. The amplifier output is applied to the four parallel connected grid electrodes of two power amplifier tubes of the 6J6 type, 141 and 143. Parasitic limiting grid resistors 145 may be included in each of the grid leads. The four plate electrodes are also connected in parallel through low resistance parasitic limiting resistors 147 and thence to the output plate terminal 149 which is the terminal P shown in Fig. 2. The two cathode electrodes of the output tubes are connected together to the output terminal 151 which is the K terminal shown in Fig. 2.

The power amplifier output, that is, the plate and cathode terminals 149 and 151, are also connected to a four pole double throw polarity reversing switch 153 which functions in the same manner as the polarity reversing switches shown in Fig. 2, to connect a Micropot 155 in the plate circuit and a resistor 157, having the same value of resistance, in the cathode circuit when the switch is in one position, and reversing the position of the Micropot and resistor in the other position of the switch. As before, the —B (or ground) and +B connections to a source of potential of the order of 150 volts direct current, not shown, are made by the polarity reversing switch.

The movable contact of the Micropot 155 applies a 1000 cycle voltage, of one phase or the other, to a bridge circuit which includes in the order named, a phasing network 167, a balancing potentiometer 169, a second phasing network 171 and a voltage divider which includes a resistor network comprising a first resistor 173 and a second resistor 175. The ratio of the two resistors is selected so that a voltage division of 10 to 1 is produced when connection is made to their midpoint as by means of a multiplier switch 177. The lower end of resistor 175 is grounded and the opposite end of resistor 173 connected to the movable arm of a multipoint contact switch 179. Various positions of the selector switch 179 are connected to input terminals $X_1, X_2, \ldots X_n$ which are the similarly identified terminals shown in Fig. 2 to which the unknown X voltages are connected. In addition two positions are provided for the plate P and cathode K terminals of the power amplifier for the purpose of calibration. Resistor 173 of the multiplier network may be shunted by a small variable capacitor for balancing the phase of the X voltage applied to the bridge when the switch 177 is in the multiply-by-10 position.

The movable arm of potentiometer 169 is coupled through capacitor 181 to gain control potentiometer 183 which applies the voltage developed by the bridge to the input of a 1000 cycle amplifier 185. The output of this amplifier is connected to the vertical deflecting electrodes of a conventional cathode ray indicator tube 187. Synchronized horizontal scanning voltage for the cathode ray tube is applied by a suitable amplifier 189, the input of which is taken from the output of the oscillator 135.

The system is adjusted in the following manner. Place multiplier switch 177 on the 1:1 position. Place selector switch 179 on position P. Place polarity switch 153 in the "+" position so that the Micropot is in the cathode circuit. Turn the Micropot control to a maximum output. Voltages of equal amplitude and opposite phase are then being impressed across the bridge. If the cathode ray trace is elliptical, adjust the phasing capacitors in the bridge circuits to balance the phase and produce straight line trace. Adjust potentiometer 169 to null position indicated by absence of vertical deflection. Then place selector switch 179 on position K, reverse the position of switch 153 and recheck.

The bridge and indicator are of the null type. Having set the various "Y" networks of Fig. 2 in accordance with the similarly identified constants of the simultaneous equations to be solved and also set the necessary number of "A" networks to values representing the coefficients of $X_1, X_2, \ldots X_n$, the actual value $X_1$ is first determined by placing selector switch 179 to the $X_1$ position. This applies an alternating voltage of a certain amplitude across the multiplier network. A voltage of the same frequency is also present at the terminal of the Micropot 155. Switch 153 is operated to make these voltages of opposite phase. If they are not of equal amplitude, a voltage will appear at the input of amplifier 185 and a vertical deflection will be produced in the cathode ray tube producing a line at an angle which depends on their relative amplitudes. Adjusting Micropot 155 will then vary the amplitude of the reference voltage. This is done until the two voltages are exactly equal in amplitude at which point there will be no vertical deflecting voltage applied to the cathode ray tube and only a single horizontal line will be produced. At this point of balance the reference voltage developed by Micropot 155 is exactly equal to the unknown voltage $X_1$, and its amplitude may be measured by any suitable voltmeter or, preferably, determined from the calibration of the Micropot, always considering the position of the 10:1 voltage divider switch 177.

It will be observed that with the bridge system illustrated, the actual amplitude of the reference voltage need not be determined, since the same voltage is applied both to the bridge input and to the "Y" networks, and any change in the amplitude of this voltage is compensated by reason of the fact that a like change is applied both to the balancing voltage and to the input of the networks. The relative value is determined, however, by the calibration of the Micropot 155 and this indicates the value of the unknown $X_1$. Its sign is determined by the position of polarity reversing switch 153. If the X voltage is of sufficient amplitude that a balance cannot be obtained within the range of Micropot 155, multiplier switch 177 is used to reduce the X voltage in the ratio of 1:10. The indicated value of $X_1$ is then multiplied by 10 to obtain the proper value. The values of $X_2$, $X_3$, ... $X_n$ are then determined in sequence in the same manner.

It will be appreciated that any equation may be multiplied or divided by any number without affecting its identity. For this reason it is well to consider the range of the coefficients and constants in the equations to be solved, and multiply or divide one or more equations by 10 or a power thereof, as the case may be, to bring all equations within the same general range. This is necessary in order to take advantage of the maximum possible accuracy. The potentiometer dials are of the counter type, in which the dial is rotated 10 times to complete the movement of the contact arm from one extreme to the other. A counter indicates how many revolutions have been made. Reading first the counter and then the dial calibration, which reads from 0 to 100°, the numbers 763, for example, may be multiplied or divided by powers of 10 as desired to suit the actual values of the constants and coefficients of the equation in question. However, it is important that for any equation the same range be used throughout. Thus, maximum accuracy is achieved for the equation $$3X + 4Y = 7$$

when the calibration maximum is assumed to be 10, since this equation can be set to the following accuracy: 3.00, 4.00 and 7.00.

What we claim is:

1. A simultaneous equation solver including means providing a first group of constant frequency voltages each of which has an amplitude proportional to the value of the constant term of a different one of said equations and has a phase of 0 or 180 electrical degrees depending on the sign of said value, separate amplifiers each having applied to its input circuit a different one of the voltages of said first group, a matrix connected to the output circuits of said amplifiers for providing other voltages representative of the product of each coefficient and its associated unknown in said equations, means connected between said matrix and the inputs of said amplifiers for combining with each constant term representing voltage the ones of said other voltages which represent the product of each coefficient and its associate unknown in the equation containing that constant, and filter means interconnected with each of said amplifiers to maintain the phase of the input voltage of said amplifiers at 0 or 180 electrical degrees for said constant frequency and within a phase margin of ±90 electrical degrees for other frequencies at which the gain of said amplifier is greater than unity.

2. A simultaneous equation solver including means providing a first group of constant frequency voltages each of which has an amplitude proportional to the value of the constant term of a different one of said equations and has a phase of 0 or 180 electrical degrees depending on the sign of said value, separate amplifiers each having applied to its input circuit a different one of the voltages of said first group, a matrix connected to the output circuits of said amplifiers for providing other voltages representative of the product of each coefficient and its associated unknown in said equations, means connected between said matrix and the inputs of said amplifiers for combining with each constant term representing voltage the ones of said other voltages which represent the product of each coefficient and its associate unknown in the equation containing that constant, filter means interconnected with each of said amplifiers to maintain the phase of the input voltage of said amplifiers to maintain the phase of the input voltage of said amplifiers at 0 or 180 electrical degrees for said constant frequency and within a phase margin of ±90 electrical degrees for other frequencies at which the gain of said amplifiers is greater than unity, and means including a bridge circuit connected to provide a resultant voltage indicative of the values of the unknown terms of said equations.

3. A simultaneous equation solver including means providing a first group of constant frequency voltages each of which has an amplitude proportional to the value of the constant term of a different one of said equations and has a phase of 0 or 180 electrical degrees depending on the sign of said value, separate amplifiers each having applied to its input circuit a different one of the voltages of said first group, a matrix connected to the output circuits of said amplifiers for providing other voltages representative of the product of each coefficient and its associated unknown in said equations, means connected between said matrix and the inputs of said amplifiers for combining with each constant term representing voltage the ones of said other voltages which represent the product of each coefficient and its associate unknown in the equation containing that constant, each of said amplifiers having its different stages intercoupled through filter circuits which have their points of maximum phase shift staggered so that the phase of the input voltage of said amplifiers is maintained within a phase margin of ±90 electrical degrees at frequencies which differ from said constant frequency and have their amplitude increased by said amplifiers.

GEORGE W. BROWN.
EDWIN A. GOLDBERG.

No references cited.